United States Patent Office 2,745,839
Patented May 15, 1956

2,745,839

N-ISONICOTINOYL-HYDRAZONES AND A PROCESS OF PREPARING THEM

Gustav Ehrhart, Bad Soden am Taunus, and Walter Aumüller, Frankfurt am Main, Germany, assignors to Farbwerke Hoechst A. G., vormals Meister Lucius & Brüning, Frankfurt am Main, Hochst, Germany, a German company No Drawing. Application August 5, 1953,
Serial No. 372,605

Claims priority, application Germany August 9, 1952

1 Claim. (Cl. 260—295)

Isonicotinic acid hydrazide, for the first time prepared by S. H. Meyer and Mally (Monatshefte der Chemie, volume 33, page 400) has, of late, proved to be a highly effective tuberculostatic. In addition, it is known that isonicotinoyl-hydrazones, which are derived from aldehydes or ketones, likewise possess a good action against tuberculosis (cf. Zeitschrift für Naturforschung, volume 7b, (1952), page 465).

Now we have found that highly effective tuberculostatic derivatives of isonicotinic acid hydrazide are obtained by reacting compounds of the general formula

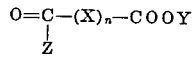

wherein X stands for $CH_2$, Y stands for hydrogen or an alkyl group and Z stands for hydrogen, an alkyl or an esterified carboxyl group, and $n$ represents zero or one, or their derivatives containing a reactive carbonyl group with isonicotinic acid hydrazide.

As compounds of the general formula

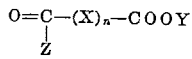

there are mentioned, for instance: glyoxylic acid and its alkyl esters, especially those of lower aliphatic alcohols such as glyoxylic acid methyl ester, ethyl ester, propyl ester or butyl ester, furthermore pyruvic acid and its alkyl esters, such as pyruvic acid methyl ester, ethyl ester or propyl ester, acetoacetic acid methyl ester, ethyl ester or propyl ester, oxalacetic acid methyl or ethyl ester and the like. As derivatives of these compounds containing a reactive carbonyl group there come into consideration, for instance, the addition products of alcohols such as methanol, ethanol or of thioalcohols such as methyl mercaptan, ethyl mercaptan and the like which are split up during the reaction with reformation of the above compounds.

The reaction of the above compounds with isonicotinic acid hydrazide is advantageously carried out in an organic solvent in which the reactants, above all isonicotinic acid hydrazide, are sufficiently soluble. As such solvents there are suitable, for instance, the lower aliphatic alcohols such as methanol, ethanol, propanol and others. In this case it is immaterial whether the reactants are first dissolved for themselves in the respective solvents and the solutions are then combined or whether the isonicotinic acid hydrazide is, for instance, suspended in the solution of one of the said compounds in an aliphatic alcohol and the mixture is heated until complete dissolution has taken place.

Sometimes it is of advantage to operate in an aqueous medium. N-isonicotinoyl-glyoxylic acid ethyl ester hydrazone can, for instance, be obtained by reacting isonicotinic acid hydrazide in an aqueous medium with glyoxylic acid ethyl ester ethyl alcoholate. The reaction of the free ketonic acids with the isonicotinic acid hydrazide is also best effected in water, it being of advantage to add an aqueous solution of isonicotinic acid hydrazide to an aqueous solution of the respective acid or vice versa.

If the keto compound used is very reactive, its reaction with isonicotinic acid hydrazide can be carried out at a temperature of 20° C.–30° C. This is, for instance, the case if glyoxylic acid or pyruvic acid is used. In other cases it is recommended to heat the reaction solutions which operation is advantageously carried out by boiling them under reflux on the steam bath.

The compounds of the present invention, especially those which are derived from glyoxylic acid esters, are distinguished from the known compounds by their superior tolerability. Their toxicity is considerably lower than that of isonicotinic acid hydrazide. N-isonicotinoyl-glyoxylic acid ethyl ester hydrazone, for instance, has only one tenth of the toxicity of isonicotinic acid hydrazide while being just as active.

The following examples serve to illustrate the invention, but they are not intended to limit it thereto.

Example 1

13.7 grams of isonicotinic acid hydrazide are dissolved in 120 cc. of water and 20 grams of glyoxylic acid ethyl ester ethyl alcoholate are added while stirring vigorously. After about 5 minutes, crystals begin to separate which, after standing over night, are filtered with suction and dried in a desiccator (16 grams). For purification, the crude product is boiled with acetic ester. On cooling of the hot filtered solution, pure N-isonicotinoyl-glyoxylic acid ester hydrazone crystallises out. For the analysis it is recrystallised from acetic ester. It melts at 163–163.5° C.

Example 2

685 grams of isonicotinic acid hydrazide are suspended in 5.5 litres of ethyl alcohol. 635 grams of glyoxylic acid ethyl ester are added and the whole is heated to gentle boiling. The solution is kept boiling for one hour, subsequently filtered and allowed to cool. After standing over night, the crystals that have separated are filtered with suction and recrystallised from ethanol. There are obtained 995 grams of N-isonicotinoyl-glyoxylic acid ethyl ester hydrazone melting at 163° C.–163.5° C. A further small quantity of the hydrazone is obtained by concentrating the mother liquor.

In an analogous way N-isonicotinoyl-glyoxylic acid butyl ester hydrazone can be obtained in a good yield by heating isonicotinic acid hydrazide and glyoxylic acid butyl ester in ethanol or methanol. After recrystallisation from a mixture of acetic ester and methanol the substance melts at 166° C.–167° C.

Example 3

According to the method of working described in Example 2, 714 grams of N-isonicotinoyl-glyoxylic acid ethyl ester hydrazone melting at 163° C.–163.5° C. are obtained from 500 grams of isonicotinic acid hydrazide and 675 grams of glyoxylic acid ethyl ester monoethyl alcoholate by heating for one hour.

Example 4

27.4 grams of isonicotinic acid hydrazide are dissolved in 230 cc. of hot methanol. Thereupon, there are added 40 grams of glyoxylic acid methyl ester monoethyl alcoholate dissolved in 20 cc. of methanol. The whole is then heated for 20 minutes on the steam bath. On rubbing, crystallisation sets in spontaneously. After cooling, the crystals are filtered off with suction, and after recrystallisation from methanol, N-isonicotinoyl-glyoxylic acid methyl ester hydrazone is obtained in a very good yield. It melts at 166° C. with decomposition. From the mother liquor another small quantity of a compound of the same composition is obtained which melts at 185° C. with decomposition.

*Example 5*

13.7 grams of isonicotinic acid hydrazide are dissolved in hot methanol. Pyruvic acid methyl ester is added in a quantity exceeding the equivalent quantity by 10–20% and the reaction mixture is heated for some time on the steam bath. The crystals of isonicotinoyl-pyruvic acid methyl ester hydrazone obtained after cooling of the solution are purified by crystallising them from methanol. They melt at 182° C. The yield amounts to about 70% of the theoretical yield.

*Example 6*

13.7 grams of isonicotinic acid hydrazide are dissolved in 140 cc. of water. A solution of 10 grams of pyruvic acid in 30 cc. of water is added. A precipitate of isonicotinoyl-pyruvic acid hydrazone is obtained in a very good yield. For purification, it is dissolved in dilute ammonia and, by acidifying with acetic acid, crystallized again. It melts at 211° C. with decomposition. The yield amounts to 90% of the theoretical yield.

*Example 7*

13.7 grams of isonicotinic acid hydrazide and 145 grams of acetoacetic ester are dissolved in 1 litre of hot ethanol. The solution is heated to boiling for 1 to 2 hours on the steam bath while being simultaneously concentrated. After completely distilling off the alcohol under reduced pressure, the residue is triturated with acetic ester and crystals of isonicotinoyl-acetoacetic acid ethyl ester hydrazone are obtained. The product is dissolved in hot benzene and crystallized again by adding ether to the solution. It melts at 97° C. The yield amounts to about 150 grams.

*Example 8*

54.8 grams of isonicotinic acid hydrazide are dissolved in 1 litre of absolute alcohol. Thereupon, 80 grams of oxalacetic ester are added. The whole is concentrated to about ⅓ of its original volume by heating on the steam bath and allowed to cool. Crystals of isonicotinoyl-oxalacetic acid diethyl ester hydrazone separate from the violet solution. They are filtered off by suction and dried. The yield amounts to about 66 grams. After recrystallisation from alcohol, the substance melts at 124° C.–125° C.

We claim:

The compound of the formula

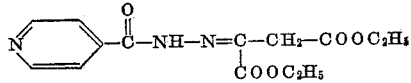

No references cited.